United States Patent Office 3,046,179
Patented July 24, 1962

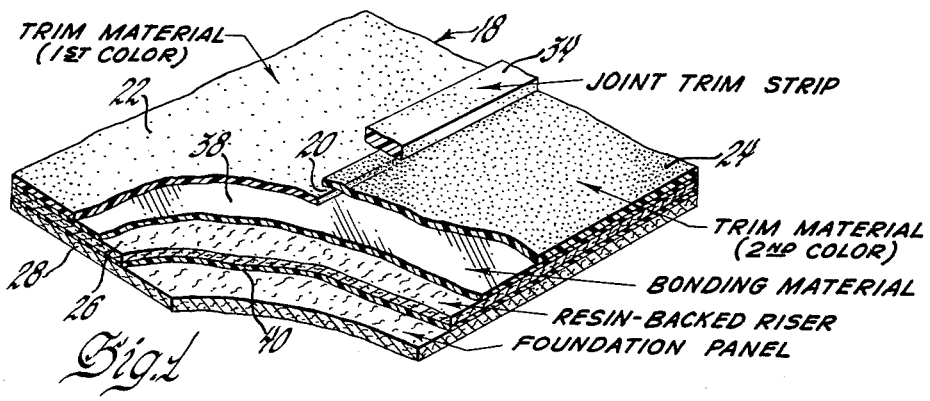
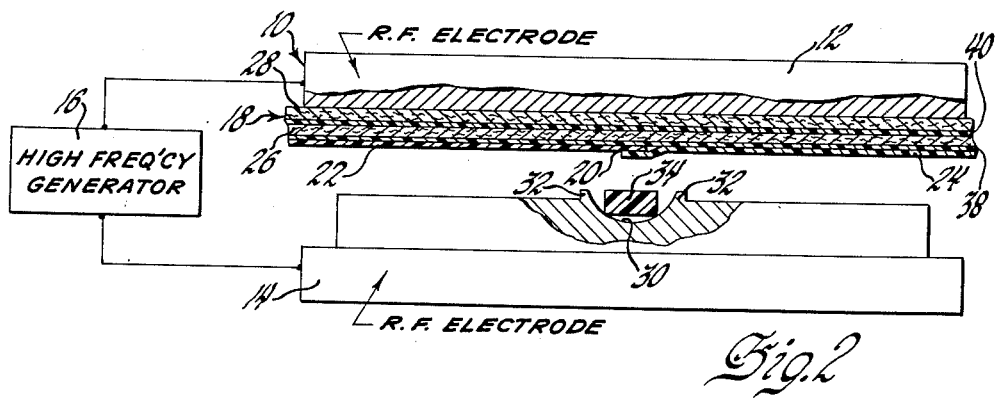
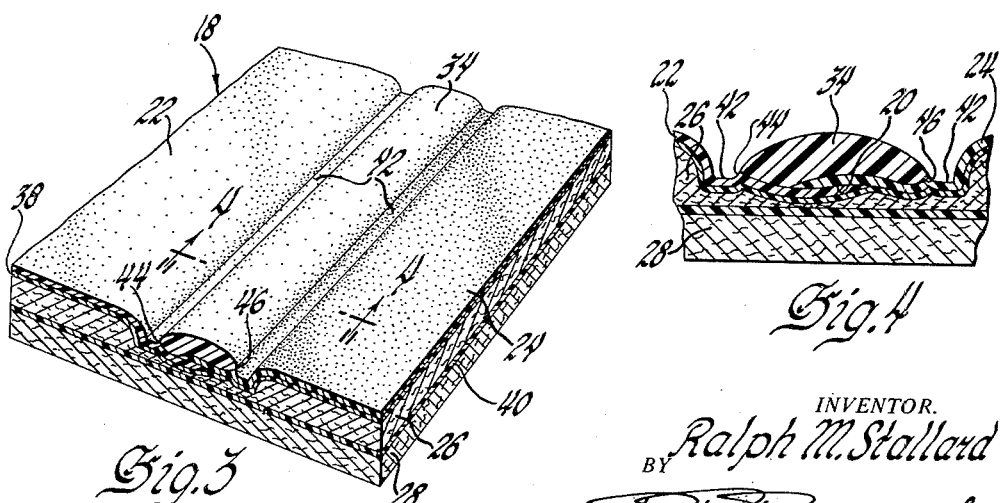

3,046,179
TRIM PANEL JOINT COVERING
Ralph M. Stallard, Utica, Mich., assignor to General Motors Corporation, Detroit, Mich., a corporation of Delaware
Filed Dec. 13, 1957, Ser. No. 702,653
3 Claims. (Cl. 156—219)

The present invention relates to an article, such as a trim panel, which is comprised of a plurality of laminated materials and in which it is desired to utilize a decorative strip to cover the exposed joint between a pair of laminated sheets. The present invention also relates to the method utilized in the formation of a trim panel having such a decorative strip covering the joint between a pair of laminated sheet members.

In making trim panels, such as those used on the doors of automotive vehicles, it is common practice to use a plurality of sheets of material to cover the panel especially where multi-colored sections are desired. The inevitable result of using a plurality of such sheets in a trim panel is to leave an exposed joint which, unless covered, results in a rather unsightly appearance. Accordingly, it has been the practice to cover such joints with various types of trim strips. Most commonly these trim strips have been made of metal and fastened to the trim panel through clips or other suitable mechanical fastening means. The use of such strips and their attendant clipping or fastening means has represented a costly and time consuming process which has tended to discourage or at least seriously limit the design of trim panels to those which were relatively of plain design and which kept the number of the exposed joints to a minimum.

It is an object of the present invention to provide a method and means for inexpensively and expeditiously covering the joint between sheets of trim material. More specifically the present invention is intended for use with a trim panel employing sheets of thermoplastic materials and which sheets are adapted to be joined and the joint decoratively covered by a strip of thermoplastic material. By the present method an article is realized which is not only decorative but in which the joint between laminated sheets is strengthened by the decorative trim strip.

It is an important object of the present invention to utilize a joint covering trim strip material which is capable of being dielectrically heated and bonded to the laminated trim panel sheets. The fabrication of an article from materials which are capable of dielectric forming and bonding has many inherent advantages over previous methods where an effort has been made to secure a decorative trim strip to such a panel through other forms of heat bonding or mechanical clipping means as noted.

In the past, trim strips have been bonded to a trim panel through the use of heated platens. While this may be done it has been found necessary when heated platens are used to encase the thermoplastic material in a metal sheath or covering to prevent the thermoplastic material from being undesirably extruded beyond the joint being covered. The use of such protective or encasing sheaths is made necessary by one of the basic deficiencies of platen type heating. This deficiency relates to the gradient type heating which obtains when heat is externally applied to a thermoplastic material when heated platens are used.

When applying heat externally to a thermoplastic material, as occurs with heated platens, it is inevitable that the surface temperatures will be much higher than those realized toward the center of the material. Assuming an internal temperature of 350° F. is requiring to mold or bond a particular thermoplastic material, when such heating is attempted by a heated platen arrangement it is not uncommon to have surface temperatures in excess of 500° F. in order to be assured of the required 350° at points most remote from the platen. The inevitable result of this gradient type heating is to cause the thermoplastic material adjacent the platen to become softer or more fluid than the more remote portions of the material. Thus the surface of the thermoplastic trim material is relatively easily extruded causing it to flow away from the joint being covered when subjected to the normal bonding pressures.

While the use of a sheath or casing in conjunction with a thermoplastic trim strip will prevent or control such extrusion, it is apparent that it results in a more costly trim strip. Further, the panel configurations or designs are considerably limited by the resultant relatively stiff or rigid trim strip.

In the present invention a bonding method is utilized which permits a non-enclosed or non-encased trim strip of thermoplastic material to be utilized in covering a joint and further which trim strip is capable of being easily shaped or formed to any desired configuration.

While the type of trim panel with which the present joint trim strip is utilized is not limited, a preferred form and that with which the invention has been illustrated in general comprises a backing board upon which a riser material is mounted and to which the laminated decorative cover sheets are suitably bonded.

Other objects and advantages of the present invention will be apparent from a perusal of the detailed description which follows.

In the drawings:
FIGURE 1 shows an illustrative trim panel to which the subject trim strip may be bonded;
FIGURE 2 shows a trim panel and joint trim strip positioned with dielectric press;
FIGURE 3 shows a section of trim panel formed by the subject method; and
FIGURE 4 is a view along line 4—4 of FIGURE 3.

Dielectric heating is a selected heating process whereby heat is developed internally in an electrical insulating material by frictional heating brought about by the rotating and oscillating movement of the atoms and molecules of the insulator and the materials contained therein under the influence of an alternating current field. It is obvious that the more rapidly the current field alternates, the faster the movement and the more heat generated in the material. In practice, the frequency utilized for dielectric heating is in the range of two megacycles to 200 megacycles per second.

It has been found that the amount of heat actually developed in an insulating material when heated dielectrically depends on:

(1) The composition and physical characteristics of the material.
(2) The voltage placed across the material.
(3) The frequency of the alternating voltage.
(4) The time the voltage is applied.
(5) The rate of heat loss.

Likewise, it has been found that the suitability of any particular insulating material for dielectric heating is defined by the following factors:

(1) Dielectric constant (a measure of the capacity of the material to store electrical energy when subjected to an alternating current field).
(2) Power factor (measure of the amount of energy "lost" in the material by conversion to heat on changing of the current field).
(3) Dielectric strength (the amount of voltage the material can withstand before breaking down or arcing over. It is of extreme importance not to exceed the dielectric strength of the materials used in embossing dielectrically, since this would not only burn holes in the trim assembly but may also burn the costly embossing plates).

Referring to FIGURE 2 of the drawings, there is schematically shown a dielectric press 10 having upper and lower platens 12 and 14, in series with a high frequency generator 16. Positioned within the press 10 is a laminated trim assembly or panel 18 comprising sheets of trim material having a laminated joint 20. Trim material sheets 22 and 24 are mounted on a layer of riser material 26 which in turn has a backing sheet 28 secured thereto. Trim sheets 22 and 24 may be of different colors as indicated in FIGURE 1.

The lower platen 14 includes a longitudinally extending groove or die surface 30 of any desired cross sectional shape, in this instance, arcuate. Embossing blades 32 are formed on the lower platen at the upwardly open ends of die groove 30 and are longitudinally coextensive with said groove. As shown in FIGURE 2, a strip of thermoplastic trim material 34 is adapted to be supported within groove 30 in overlapping alignment with joint 20 of the trim sheets 22 and 24.

Before describing the subject method and article, it would be well by way of background to refer more specifically to certain of the materials thus far referred to.

By "backing sheet" or other similar descriptive term it is meant to include flexible materials such as fabrics formed of cotton, wool, rayon, glass fibers, synthetic fibers, etc., paper, leather, etc. as well as rigid and semi-rigid materials such as composition board, fiberboard, paper laminates, synthetic sheets and metals; by "trim material" it is meant to include leather, plastic materials, i.e., the vinyl chloride, vinylidene chloride, and other similar synthetics formed into flexible sheets with finishes simulating leather, woven fabrics, etc., and cloth materials formed of woven fibers of the natural, synthetic and glass type; by the term "riser" it is meant, in general, to specify rubber or non-rubber materials fabricated in such a way as to have interstitial voids providing a certain amount of resilience to the touch and capable of recovering its shape when temporary deforming pressures are removed; and further which material is capable of taking a permanent set with the application of pressure and heat. It is also desirable that such material be chemically inert at least relative to the other trim assembly components. The riser material may also be of a "felt" material which consists of a blend of torn up waste paper and rags suitably blended to provide the requisite strength as described in copending application Serial No. 688,853, Spieles, filed October 8, 1957.

It is to be understood that the aforenoted materials are merely for illustrative purposes and the fundamental requirement of the materials constituting the trim panel is that it be constituted of materials capable of forming a good dielectric sandwich or assembly.

With regard to the trim strip 34, it may be formed of any suitable thermoplastic material which likewise has good dielectric properties. In general, such a trim strip may be formed of the materials referred to in relation to the "trim material" described above. The trim strip may be provided in any desired cross sectional form either that ultimately desired when bonded to the trim panel or, and as illustrated in FIGURES 1 and 2, it may be of flat strip stock which is ultimately formed to an arcuate cross sectional shape by the die groove 30.

For ease of handling the trim panel 18 and prior to the bonding of the trim strip 34 thereto, a subassembly is formed and comprises securing the trim material sheets 22 and 24 to the riser material 26 and the riser in turn to the backing sheet 28 by a suitable cement or adhesive substance. While substantially any cement or adhesive compatible with the materials of the trim panel may be used, it has been found very satisfactory to use a rubber latex which is capable of simultaneously introducing a controlled amount of moisture into the riser. It is found that those portions of the trim panel which are to be embossed may be done so more effectively when the controlled quantities of moisture are present that when it is not. The following procedure has been found to be satisfactory as one means of introducing an adhesive to the assembly: the backs of trim materials 22 and 24 are spray coated with a 60% solids latex emulsion at the same time that the surface of the riser material is roll coated with a 30% solids latex emulsion. In this way both the trim materials are adhered to the riser material through a latex bond 38. The same may be done between the riser and backing board or instead any suitable resin bond 40 may be used. Thus a subassembly is formed which is more easily handled within die press 10.

Referring now to the method of fabricating the trim panel, it will be seen, referring to FIGURE 2, that the trim strip 34 is disposed within the die groove 30 and thereafter the trim panel placed in alignment with the trim strip such that the strip overlays the joint 20 formed by the trim materials 22 and 24. Thereafter one of the platens is moved toward the other and the assembly dielectrically heated to bond the trim strip 34 over joint 20.

During the dielectric heating, the blades 32 emboss the trim panel 10 to provide grooves or flat portions 42 on either side of the trim strip 34. The embossed grooves 42 provide a sharp definition between strip 34 and sheets 22 and 24 further enhancing the design of trim panel 10. More importantly, however, the embossing blades 32 prevent the trim strip 34 as well as the sheet material beneath the strip from being extruded away from joint 20 during the dielectric bonding process. As best seen in FIGURE 4 the embossing blade will create a dam effect at points 44 and 46 which prevents the materials from being extruded as noted under the influence of the bonding pressures. By thus preventing the undesired extrusion of the thermoplastic materials sharp definitions are maintained between the various materials enhancing the appearance of the finished trim panel. The particular use and disposition of embossing blades 32 also facilitates elimination of an encasing or sheath material about the thermoplastic trim strip as has been required by certain previous bonding methods.

In the actual bonding and embossing process it is found that a very satisfactory embossment and bond is obtained by applying a platen pressure of from about 200 to 600 p.s.i. a pressure of about 400 p.si. being suitable in substantially all instances. The platen pressure serves two functions, that of obtaining adequate bond strength between the various trim panel materials and that of imparting good definition of the part being embossed.

The dielectric heating cycle comprises two phases from the time standpoint, the length of time during which dielectric heating takes place (the heat cycle) and the length of time that pressure is maintained after the heating is accomplished (hold time or soak time). The thermal efficiency of the dielectric heating process is improved as the heat cycle is decreased since the thermal efficiency is a function of the heat loss per unit of time, loss of heat taking place by conduction through the materials of the trim panel to the embossing blades and flat surfaced electrodes of the press. It is found that a heat cycle time of from 6 to 12 seconds and a hold time also of from 6 to 12 seconds is satisfactory. The peak temperature reached during the heat cycle is about 350° F.

With regard to the voltage employed in the process, it is well known that the amount of electrical power absorbed in the insulator material and therefore the heat generated therein is dependent upon the voltage across the material, the heat generated varying as the square of the voltage. It is, therefore, the practice to use as high a voltage as possible in order to obtain the maximum heating effect in the shortest time possible. The limiting factor on the voltage however is the dielectric strength of the materials being bonded and embossed and the corona discharge effect which causes arcing along the surface of the materials. It is found that a voltage of from 1,000 to 4,000 volts across the trim assembly is satisfactory. Likewise, the frequency of the alternating current field is directly related to the generation of heat in the trim assembly. The higher the frequency, the more the heat developed, the relationship therebetween being 1 to 1. Too high a frequency may not be used, however, since the standing wave losses in the equipment increases rapidly as the frequency is raised. It is found that a frequency of about 15 megacycles per second is well suited to this process.

I claim:

1. The method of making a laminated trim assembly comprising positioning a pair of thermoplastic sheets upon a supporting assembly, said sheets being so positioned that adjacent edges thereof define a joint, disposing a thermoplastic trim strip in overlaying relationship with said joint, bringing said strip into engagement with said joint, and then dielectrically heating said trim strip and said thermoplastic sheets under sufficient pressure to cause said strip to be bonded to said sheets and to cover said joint while simultaneously confining said strip and the thermoplastic sheet material subadjacent said strip by dielectrically embossing said sheets on either of said trim strip throughout the length of and immediately adjacent said joint.

2. The method of making a laminated trim assembly comprising positioning a pair of thermoplastic sheets upon a supporting assembly, said sheets being so positioned that adjacent edges thereof define a joint, disposing a thermoplastic trim strip in overlaying relationship with said joint, bringing said strip into engagement with said joint, dielectrically heating said trim strip and said thermoplastic sheets under sufficient pressure to cause said strip to be bonded to said sheets and to cover said joint, and contemporaneously altering the cross section of said strip and embossing each of said sheets along a line extending longitudinally of and immediately adjacent said strip, said embossment preventing extrusion of said strip and the thermoplastic sheet material subadjacent said strip during the dielectric heating and bonding.

3. The method of covering a trim panel joint comprising mounting a pair of thermoplastic sheets upon a supporting member such that adjacent edges of said sheets form a laminated joint, positioning a strip of thermoplastic material in overlaying relationship to said laminated joint, moving said strip into engagement with said joint and dielectrically heating said trim strip and sheets under sufficient pressure to cause the strip to be bonded over said joint, and contemporaneously dielectrically embossing said thermoplastic sheets on either side of said trim strip throughout the length of and immediately adjacent said joint to prevent extrusion of said trim strip and said sheets.

References Cited in the file of this patent

UNITED STATES PATENTS

| | | |
|---|---|---|
| 2,282,425 | Millar | May 12, 1942 |
| 2,322,226 | Cunnington | June 22, 1943 |
| 2,338,490 | Cunnington | Jan. 4, 1944 |
| 2,618,581 | Lyijynen | Nov. 28, 1952 |
| 2,684,313 | Lyijynen | July 20, 1954 |
| 2,785,729 | Smith et al. | Mar. 19, 1957 |
| 2,914,109 | Hsu et al. | Nov. 24, 1959 |

UNITED STATES PATENT OFFICE

CERTIFICATE OF CORRECTION

Patent No. 3,046,179                                                July 24, 1962

Ralph M. Stallard

It is hereby certified that error appears in the above numbered patent requiring correction and that the said Letters Patent should read as corrected below.

Column 1, line 71, for "requiring" read -- required --; column 5, line 24, after "either" insert -- side --.

Signed and sealed this 13th day of November 1962.

(SEAL)
Attest:

ERNEST W. SWIDER
Attesting Officer

DAVID L. LADD
Commissioner of Patents